June 15, 1943. B. W. GAIR 2,321,906
COFFEE DISPENSING APPARATUS
Filed June 6, 1941 2 Sheets-Sheet 1
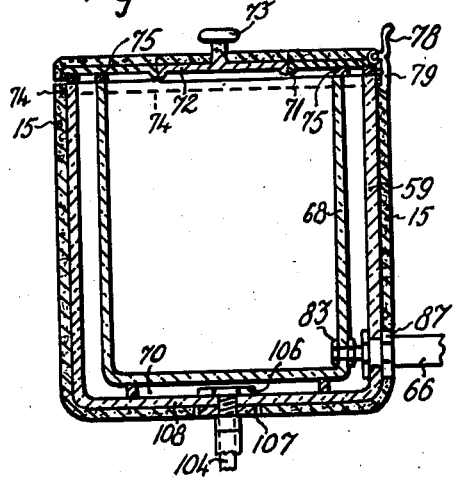
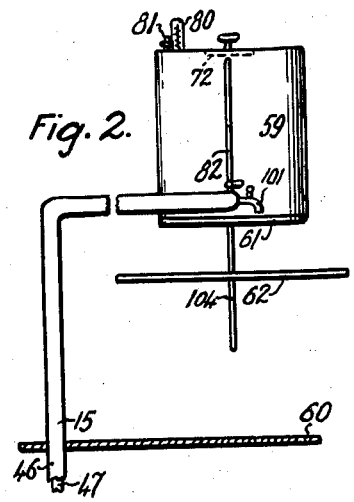
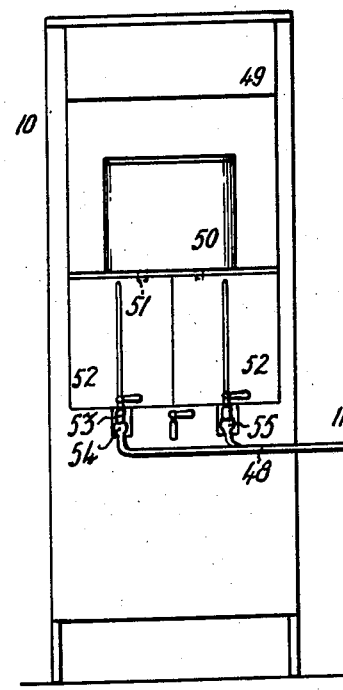
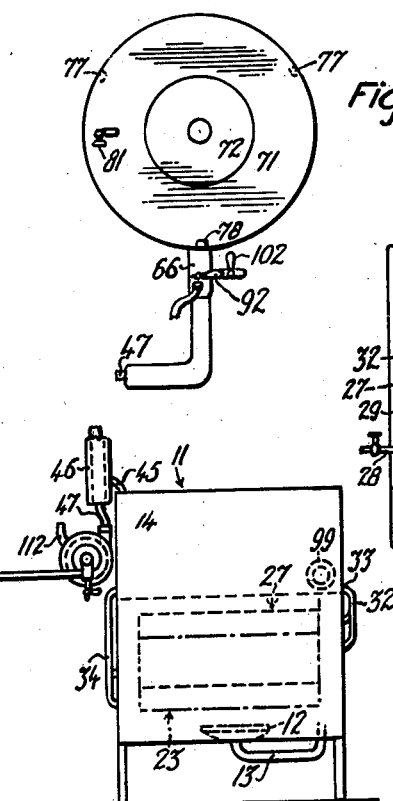
INVENTOR:
BLAIR W. GAIR,
BY
ATTORNEY

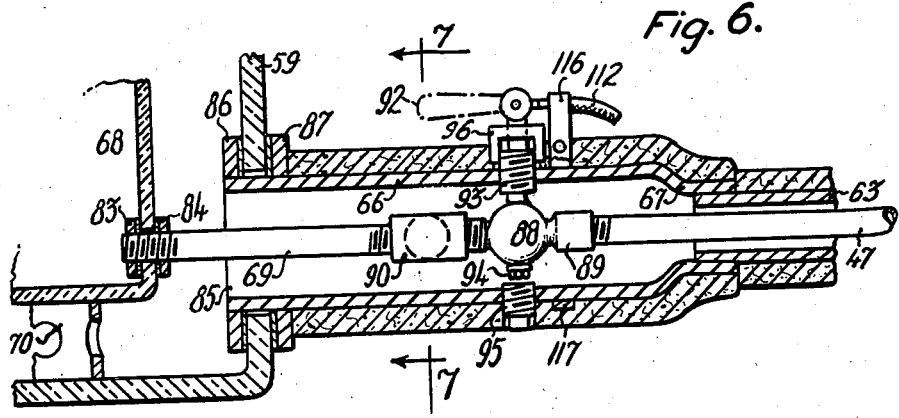

Patented June 15, 1943

2,321,906

UNITED STATES PATENT OFFICE 2,321,906

COFFEE DISPENSING APPARATUS

Blair W. Gair, Brooklyn, N. Y., assignor of thirty-three and one-third per cent to A. Jensenia Gair, and thirty-three and one-third per cent to Estella H. Gair, both of Kings County, N. Y.

Application June 6, 1941, Serial No. 396,847

12 Claims. (Cl. 53—3)

This invention relates in an important aspect thereof to apparatus for producing extractions from soluble substances, such as those of the ground coffee type, and has particular reference to apparatus for serving and dispensing food supplies, including particularly liquid supplies, and especially liquids or infusions brewed from said coffee.

The present application is a continuation-in-part of my prior application, serially numbered 370,087 of December 14, 1940, later developing into Patent No. 2,296,607, which discloses coffee brewing apparatus, and arrangements of this application are particularly adapted for incorporation with the features of said apparatus.

In my prior application means are disclosed for circulating hot or boiling water continuously in a specific direction through the ground coffee or substance to be treated, the grindings being continuously agitated, together with dual filtering means, subsequent to which, on the continuous run, the strained infusion is passed into dispensing units.

In the coffee brewing and dispensing mechanism, means are provided for maintaining, as after one brew or run is completed at the filtering chamber, the infusion in such manner that it may be used while the chamber is being supplied with new or second grindings, and one of the objects of the present invention is the provision of an arrangement in which, in one dispensing container or urn, an infusion may constantly be kept ready for use, this being while both first and subsequent runs are being made at the filtering means.

Since the coffee brewing and dispensing means are suitable for use in restaurants, lunch rooms and places of this nature, in which space is frequently limited, another general object of the invention of this application is to provide a structural arrangement in which one or more dispensers may be located at such place as near a counter, or where the beverage is individually served, while the brewing mechanism may be in a distant locality, where available space is greater.

More specifically stated, in view of the foregoing, and so as to achieve a further object, the coffee brewing mechanism may be in a location apart from or adjoining a room or compartment which contains the dispensing mechanism, and the locations of these mechanisms, according to the present arrangement, may be on different floors or levels, one above the other.

A predetermined amount of heated water is passed through the filtering chamber with the ground coffee therein, so that the required strength of the infusion may be obtained. When a run has been commenced, through the filtering chamber to the dispensing urn, the infusion may be drawn off from the urn at any time, although on some occasions the infusion may not be thus drawn off until the run has been completed, thereby to assure uniformity of strength of the infusion.

Substantially the same degree of uniformity of strength may be obtained by commencing a second or subsequent run, into the dispensing chamber, before a preceding run has been drawn completely off, and sight elements or gauges are provided.

During passage from the brewing chamber to the dispensing urn, the infusion is not externally exposed. Therefore, yet other objects of this invention, as shall hereinafter appear, reside in an arrangement in which, while preferred temperatures are maintained, the infusion may be dispensed and served in a methodical and sanitary manner, with an improved, clear appearance and having its best and original aroma.

This invention is adapted to meet present needs of individuals under service conditions, and also under conditions which seem to be developing; that is to say, recent industrial and military developments have been relatively large and praiseworthy; these developments are progressive and not yet complete, and housing and victualing of the personnel of such services present unique problems, such as those solved by this invention.

With the above indicated objects and advantages in view, as well as others which will hereinafter appear, the invention resides in certain novel constructions and arrangements of part, the essential features of which are herein clearly described, and illustrated in the accompanying drawings in which;

Fig. 1 is a partial front elevational view of a coffee brewing apparatus, with which a portion of the aforesaid dispensing mechanism is connected;

Fig. 2 is a front elevational view of another portion of the coffee dispensing mechanism of Fig. 1;

Fig. 3 is a top plan view of the structure of 2;

Fig. 4 is a side view of part of the structure of Fig. 1;

Fig. 5 is an enlarged central vertical section of a compound dispensing unit;

Fig. 6 is an enlarged vertical section of part of the unit of Fig. 5;

Fig. 7 is a partial vertical section on the line 7—7 of Fig. 6;

Fig. 8 is a fragmentary top plan view of a combined faucet and circuit control means;

Fig. 9 is an enlarged fragmentary detail view;

Fig. 10 is an enlarged sectional view of structure shown in Fig. 1;

Fig. 11 is a fragmentary elevational view on which a slight modification of structure is illustrated.

Heating means, referring in detail to said drawings, include within a housing 11, having leading thereto, in the present instance, a fuel gas supply line 13, on which is a gas burner 12, a hollow metal U-shaped shell 23, and a like hollow shell 27.

Features of the housing 11 and certain of its attached features, may be like those which are disclosed in my prior application, serially numbered 370,087, dated December 14, 1940, now issued, as previously mentioned. The prior features, as also shown herein, include a controlled water supply line 28, which has a connection 31, with a lower leg 24 of the shell 27; the latter having also an upper leg 25, said legs being connected by a hollow integral web 26.

In the present instance, the housing 11 includes a top water tank portion 14 which, as well as the other exterior portions of the housing, has thereon heat insulating material 15. The tank 14, having walls which include a bottom 16, and a top cover 17, rests on an internal ledge 18 which is fixed on the housing wall.

From the lowermost leg 24 of the hollow unit 23, at its connection 31 with the pipe 28, extends a branch 29, which leads into the tank 14, and from the upper leg 25 of the unit 23 extends a branch pipe 32, the top end 33 of which also connects with said tank.

A branch pipe 34, extending also from the hydraulic pressure line 28, and having a connection 35 with the lower leg 36 of the unit 27, likewise discharges heated water into the tank 14, and from the upper leg 37 of the unit 27, at an opening 39 extends one end of a connecting pipe 38, the other end of which, at an opening 40, communicates internally with the tank 14. A controlled drain extension 41 depends from the supply line 28, this extension being shown, in the present case, below the branch pipe 34. The housing 11 may have legs or under supports thereon, as shown, and exhaust means may include a flue, above the spaces between the several legs of the heating units 23, 27, as shown in the aforesaid prior application. The pipe connections of the units 23, 27 serve to support the latter within the housing 11.

Cooperating with the gas line 13, said line having thereon at the burner 12, a pilot light, as disclosed in my prior application, is thermostatic control means 99, so that as water reaches a predetermined temperature in the tank 14 the effective gas supply is shut off.

Rising from the tank or reservoir 14, is a pipe 45, which communicates internally with a pipe or casing 46 of relatively large diameter, which also has thereon heat insulation 15. The pipe 46 surrounds a pipe 47, a flexible continuation 48 of which connects with a coffee brewing apparatus 10.

Said apparatus includes a hot water supply tank 49, which controllably supplies liquid into a coffee filtering means 50, the latter having a discharge nipple 51, above one or more infusion containers 52, which latter are provided with control faucets 53, each alike, and having releasably associated therewith two connections 54, 55, which are carried by branches of the flexible pipe 48.

The pipe portion 47 sealingly enters one end of the casing member 46 (see Fig. 10), said member having threadedly secured therein a disc 56, through which the pipe 47 passes. Internally of the casing 46, threaded on the pipe 47, is a nut 57, and external securing means on said pipe include a bushing 58.

The showing of Fig. 2 is continuous with the showing of Fig. 1, the interposed portions of the pipe 47, with its casing 46, being arranged according to requirements. The positioning of the present coffee dispensing and brewing elements has hereinbefore been mentioned and with the brewing mechanism on a lower floor or level, coffee dispensing means including a compound container or reservoir, having an outer jar or member 59, are shown in Fig. 2 above an upper floor 60, said container having a conventional support 61 therebelow, and table 62 or the like.

As shown in Fig. 6, the upper end 47 of the pipe for conveying the infusion of coffee, with the upper end portion 63 of the casing 46 thereat, leads into a pipe control housing or compound connecting unit having an expanded tubular member 66, a reduced end 67 of which threadedly receives the end 63 of the casing 46. The compound dispensing unit, having the member or jar 59, has an inner jar member 68 spaced from the outer jar, and a continuation 69 of the coffee pipe 47 leads into the inner jar, the space between said jars, which are of glass construction, as in one instance in practice, being for hot water, and being in communication, as through said pipe 45, with the interior of the tank 14.

The jar members 59, 68 are spaced apart at the bottom by a perforated ring 70, which allows of free water movement, and on the top of said members is a cover element or disc 71, in a central opening of which fits an easily removable cover 72, having a manipulating part 73. The outer jar member is also substantially entirely covered by insulating material as shown.

Tightly embracing the top margin of the jar member 59 is a metal ring band 74. On the top edge face of each glass jar is gasket 75, one being about like the other, and the disc 71 is tightly seated in the gaskets, there being two metal catches 77, which extend from the disc or plate 71, and grip the ring 74. The plate 71, with these two catches may be removed and replaced, and another catch, pivoted on said plate, having a fingerpiece 78, and a hoop end 79, releasably grips the ring 74.

The tube of a thermometer 80 is disposed at its lower end within the exhaust cock 81 and also communicates with said space and through a slot 82 in the asbestos covering the outer jar 59, both the water level in the outer jar, and the level of the infusion within the jar 68 may be seen.

In the jars 59 and 68 are side openings, as shown, and in the opening of the inner jar is tightly sealed one terminal of the pipe portion 69, it being seen that these are threadedly mounted on said terminal nuts 83, 84, which, with packing members or washers thereat, effect the sealing joint.

An end 85 of the casing member 66 is sealingly joined to the outer jar wall 59, at its opening, there being nuts 86, 87, also with washers, as shown threadedly cooperating with said wall.

On the pipe sections 69, 47 within the tubular member 66, is a valve 88, the latter having a socket 89 for a threaded end of said section 47, and there being a threaded tubular end of the valve 88 disposed in a T-sleeve 90, which also receives a threaded end of said section 69.

The valve 88 has, on a stem thereof, all as shown, a handle 92, which passes tightly and freely through a threaded bushing 93, in the wall of the member 66, this being to facilitate assembly, and in an opposite part of the member 66 is a cylindrical threaded plug 95, linear with which, and of less diameter, are fastening means, including a nut 94, for the stem of the valve 88. To assure reliable turning movement of the stem of the valve, and its handle 92, about its axis the bushing 93 may have threadedly mounted thereon the legs of a yoke 96, through a top opening of which said stem passes.

In the compact arrangement, a tube 100, having one of its ends threadedly engaged in a leg 91, of the member 90, has its central portion lightly disposed on the wall of the member 66, and on the other end of the tube 100 is threadedly mounted a dispensing cock 101, having a handle 102. Coffee or liquid may accordingly be drawn off, through the cock 101 from the jar 68, through the pipe 69, or through the section 47, the handle 92 being selectively operable. To fill the jar 68 without dispensing the infusion, the faucet 101 may be closed, while the pump 110 operates.

From the bottom of the outer jar 59 depends a circulating branch pipe 104, which also has thereon heat insulating material. The pipe 104, which interiorly communicates with the space between the dispensing jars, is seatingly held at its upper threaded end in the bottom 108 of the outer jar 59, there being coacting nuts 106, 107, and a usual seating washer may be used thereat. In the present case, the lower end of the circulating pipe 104 communicates with the branch pipe 41.

From the filtering apparatus 50, which is operated in the manner disclosed in the aforesaid prior application, the infusion descends through the nipple 51, container 52 and pipe portions which include the sections 49 and 69. As when the dispenser 59 is about on the same level as the filtering means 50, or when the dispenser 59 is disposed on any relatively lower level. The heating means which includes the tank 14, thermostat 99, casing 46 and jar 59, 68, are at all times available for use, the levels on which the different parts of the brewing and dispensing apparatus being for this purpose immaterial.

As shown in the drawings, a centrifugal pump 110 is installed on the coffee dispensing pipe line 47, 48, 88, 69, on which is the control element 92. When the handle 92 is turned to open the valve 88, for causing the liquid to flow into the jar 68, the pump 110, by electric motor 111, is operated, there being in the motor circuit wiring 112, and switch means having, on the handle 92 (Fig. 8), an actuating extension 113.

The circuit 112 has therein a terminal 114, and a spring terminal 115, so that on turning the handle 92, as aforesaid, the spring 115 is urged by the extension 113 to close the circuit and cause the coffee infusion to be pumped. The circuit 112, supplied with current from any source, has therein a control switch, not shown, additional to the switch 113—5.

Grasping the insulated wiring 112 are the ends 116 of a metal clamping strip 117, which fixedly embraces the casing member 66, said member having also thereon an insulating covering, as described.

The showing of Fig. 11 is in all respects identical with the disclosure of Figs. 1–10, except that in the modified showing, the connection 54 is directly releasably engaged with the discharge nipple 51, the flexible line 48 being passed to the pump 110, as already described. In using the apparatus of Fig. 11, a considerable quantity of the brew or run, from the means 50, is first allowed to pass into the jar 68, before the cock 101 is used for dispensing purposes.

While I have for the sake of clearness, and in order to disclose my invention so that the same can be readily understood, described in general terms and illustrated specific devices and arrangements of said invention, I desire to have it understood that this invention is not limited to the specific form disclosed but may be embodied in other ways that will suggest themselves, in view of this broad disclosure, to persons skilled in the art. It is believed that this invention as set forth in the claims, is new, and it is the desire to thus claim it, so that all such changes as come within the scope of the claims as appended hereto may be considered as part of this invention.

I claim:

1. The combination with a device for making infusions of coffee comprising a double walled chamber including an inner grindings receiving vessel and an outer vessel spaced from the first vessel and having a bottom discharge nipple, of a dispensing apparatus including a double walled container having an inner infusion receiving jar, an outer jar providing a fluid space around the first jar, a pipe leading from said nipple through the wall of the outer jar and communicating internally with the inner jar, said pipe having thereon a discharge faucet; a constainer for heated fluid, a heat insulating casing surrounding the pipe between the container and the outer jar, said casing providing a fluid space around the pipe in communication with the fluid space between the jars; and means cooperating with said fluid container for heating the fluid therein.

2. The combination with an apparatus for making infusions of coffee comprising a double walled filtering chamber including an inner grindings receiving vessel and an outer vessel spaced from the first vessel and having a bottom discharge nipple, of a dispensing apparatus including a double walled container having an inner infusion receiving jar, an outer jar providing a fluid space around the first jar, a pipe leading from said nipple through the wall of the outer jar and communicating internally with the inner jar, said pipe having thereon near the jars a discharge faucet; a pump through which said pipe leads; a heat insulating casing surrounding the pipe between the pump and outer jar, said casing providing a fluid space around the pipe in communication with the fluid space between the jars; a container for heated fluid, said latter container being in communication with said spaces, and means cooperating with said latter container for heating the fluid therein.

3. In combination with a device for making infusions of coffee comprising a double walled chamber including an inner grindings receiving vessel and an outer vessel spaced from the first vessel and having a discharge nipple, a dispensing apparatus including a double walled container having an inner infusion receiving jar, an outer jar providing a fluid space around the first jar, a pipe leading from said nipple through the wall of the outer jar and communicating internally with the inner jar, said pipe having thereon a discharge faucet; a container for fluid, a heat insulating casing surrounding the pipe between the container and the outer jar, said outer jar including a closed top and having a bottom opening, said casing providing a fluid space around the pipe in communication with the fluid space between the jars; means for heating the fluid in the last mentioned container, and a circulating pipe having one end communicating with the bottom opening of the outer jar, said latter pipe having its other end communicating with the bottom part of said fluid container.

4. In combination with a machine for brewing infusions of coffee, comprising an infusion discharge pipe, an infusion dispensing apparatus including a double walled container comprising an inner infusion jar, an outer jar providing a fluid space around the first jar, the outer jar including a closed top and having a bottom opening, said pipe having one of its ends passing through the walls of said jars and being sealingly held in the wall of the inner jar, said pipe having thereon at least one discharge faucet; a container for fluid having a lowermost fluid pressure supply line, a heat insulating casing surrounding said pipe between the fluid container and the outer jar, the casing providing a fluid space around the pipe in communication with the space between the jars, means for heating fluid in the last mentioned container, and a circulating pipe having one of its ends interiorly communicating with the opening in said outer jar, the other end of the fluid pipe being in communication with the interior of the fluid container at the supply line thereof.

5. In combination with a device for brewing infusions of coffee, comprising an infusion chamber having a discharge pipe, a dispensing apparatus including a double walled container comprising an inner infusion jar, an outer jar providing a fluid space around the first jar, the outer jar including a closed top and having a bottom opening, said pipe having one of its ends passing through the walls of said jars and being sealingly held in the wall of the inner jar, said pipe having thereon a discharge faucet; means mounted in association with said pipe for forcing the infusion therethrough; a container for fluid having a fluid supply line, a heat insulating casing surrounding said pipe between the liquid container and the outer jar, the casing providing a fluid space around the pipe, said casing being in communication internally with the fluid container and with the space between said jars, means for heating fluid in the last mentioned container, and a circulating pipe having one end interiorly communicating with the opening in the outer jar, the other end of the fluid pipe being in communication with the interior of the fluid container at the supply line thereof.

6. The combination according to claim 5, and in which the coffee brewing device and the liquid container are disposed on one floor or level, the arrangement having a second floor above the first floor, said double walled infusion container being disposed on the second mentioned floor.

7. In combination with means for brewing infusions of coffee, comprising an infusion chamber including an outer vessel having an infusion discharge pipe, a dispensing apparatus having a double walled reservoir remote from said apparatus, said pipe being relatively long, said reservoir including an inner infusion jar an outer jar providing a fluid space around the first jar, the outer jar including a closed top and having a bottom opening, said pipe having one of its ends passing through the walls of said jars and being sealingly held in the wall of the inner jar, a plurality of discharge faucets on said pipe; means including a pump mounted on said pipe near the brewing means for forcing the infusion to the reservoir; a hydraulic or fluid container, a heat insulating casing surrounding said pipe between the container and the outer jar, the casing providing a fluid space around the pipe, said casing being in communication internally with the fluid container and with the space between said jars; means for heating the fluid in said container, and a circulating pipe having one of its ends communicating with the bottom of the fluid container, said latter pipe having its other end in communication with the opening in said outer jar.

8. In an apparatus for dispensing infusions comprising an inner infusion vessel and an outer vessel providing a space around the inner vessel for a heating fluid, an infusion supply line passing through the wall of the outer vessel into the inner vessel, said line having also thereon a dispensing cock, the latter including a stem for a discharge end and a stem for a handle; a container for heating fluid, said container having at the top thereof, a supply pipe, a casing continuing from the pipe and surrounding the infusion supply line, the casing providing a passage around said line, the passage being in communication with said space, said stems being sealingly held in the wall of said casing, and a circulating branch pipe communicating with said space and extending from the bottom of the outer vessel to the bottom of said container.

9. An apparatus for dispensing infusions of coffee comprising in combination with an infusion supply line having power driven means for urging the infusion therethrough, a double walled container having an inner infusion jar, an outer jar providing a space around the first jar for a heating fluid, said jars having top closure means, the outer jar having a side opening, said line passing freely through the opening and having its end sealed in the wall of the inner jar for delivering the infusion thereto; means for supplying a heating fluid to said space, said means having a casing around the infusion line with its delivery end sealed in said opening, a fluid circulating branch extending from the outer jar below said delivery end, and a bottom support in said space for the inner jar.

10. An apparatus for dispensing infusions of coffee comprising in combination with an infusion supply line having power driven means for urging the infusion therethrough, a double walled container having an inner infusion receiving jar, an outer jar providing a space around the first jar for a heating fluid, the outer jar having in its wall an opening, said line passing freely through the opening and having its delivery end sealed in the wall of the inner jar; means for supplying heating fluid to said space, said means having a casing around said line with its delivery end communicating with said space through the opening, a discharge pipe for the fluid, leading from the outer jar, and means supporting the inner jar disposed in said space.

11. In a coffee infusion dispensing means, the combination of a double walled container including an inner infusion containing jar having an outer jar with an opening in its side wall and providing a space around the first jar for a heating fluid, said jars having top closure means, means for supplying a heating fluid to said space, said latter means including a casing having a delivery end sealed in said opening; an infusion supply line having a portion thereof passing axially through said casing and having one end communicating interiorly with the infusion jar, said latter end being sealed in the wall of said latter jar; means including a pump and an electric motor for urging the infusion through said line; and control means, including a handle, for the circuit of said motor and said line, said control means having a valve on said line, there being a stem of the valve extending through the casing and carrying said handle.

12. The combination according to claim 11, in which said circuit includes a spring switch member at the stem of said handle, said stem having thereon a finger, whereby the motor circuit may be closed simultaneously with the opening of the bore of the infusion line.

BLAIR W. GAIR.